(12) United States Patent
Larsson

(10) Patent No.: US 12,479,306 B2
(45) Date of Patent: Nov. 25, 2025

(54) ELECTRICALLY POWERED TRAILER WITH AN ENDURANCE BRAKING FUNCTION

(71) Applicant: Volvo Truck Corporation, Gothenburg (SE)

(72) Inventor: Lena Larsson, Västra Frölunda (SE)

(73) Assignee: Volvo Truck Corporation, Gothenburg (SE)

( * ) Notice: Subject to any disclaimer, the term of this patent is extended or adjusted under 35 U.S.C. 154(b) by 210 days.

(21) Appl. No.: 18/281,595

(22) PCT Filed: Mar. 16, 2021

(86) PCT No.: PCT/EP2021/056695
§ 371 (c)(1),
(2) Date: Sep. 12, 2023

(87) PCT Pub. No.: WO2022/194357
PCT Pub. Date: Sep. 22, 2022

(65) Prior Publication Data
US 2024/0157805 A1    May 16, 2024

(51) Int. Cl.
*G06F 17/00*    (2019.01)
*B60L 7/18*    (2006.01)
*B60L 58/15*    (2019.01)

(52) U.S. Cl.
CPC .............. B60L 7/18 (2013.01); B60L 58/15 (2019.02); *B60L 2200/28* (2013.01); *B60L 2240/26* (2013.01); *B60L 2240/64* (2013.01)

(58) Field of Classification Search
CPC ........ B60L 7/18; B60L 58/15; B60L 2200/28; B60L 2240/26; B60L 2240/64; B60L 2200/36; B60L 2240/642; B60L 2240/66; B60L 2240/68; B60L 2240/70; B60L 2260/52; B60L 2260/54; B60L 7/22; B60L 58/14; B60W 2300/12; B60W 2510/244;
(Continued)

(56) References Cited

U.S. PATENT DOCUMENTS 10,518,831 B2    12/2019    Wright
10,696,165 B2 *   6/2020    Bennett ............... B60L 15/2045
(Continued)

FOREIGN PATENT DOCUMENTS

EP    3124302 B1    7/2019
WO    20142829 A1    7/2020

OTHER PUBLICATIONS

Unveiling the determinants of battery electric vehicle performance (Year: 2024).*
(Continued)

*Primary Examiner* — Ronnie M Mancho
(74) *Attorney, Agent, or Firm* — Sage Patent Group

(57) ABSTRACT

A vehicle unit comprising a vehicle control unit, VCU, an electrical energy storage system, and at least one electric machine arranged for regenerative braking, wherein the electric machine generates an electrical output current during regenerative braking, wherein the control unit is arranged to obtain a desired energy absorption capability value of the vehicle unit and to control an energy dissipation from the EESS to maintain an energy absorption capability of the EESS above the desired energy absorption capability value.

15 Claims, 3 Drawing Sheets

(58) Field of Classification Search
CPC ....... B60W 2556/55; B60W 2710/244; B60W 20/14; B60W 30/18127; B60T 1/10; B60T 7/18; B60T 7/22; B60T 8/1887; B60T 2210/12; B60T 2210/20; B60T 7/20; B60T 8/24; B60T 2270/60; F16D 61/00
USPC .......................................................... 701/22
See application file for complete search history.

(56) References Cited

U.S. PATENT DOCUMENTS

| | | | | |
|---|---|---|---|---|
| 11,569,668 | B2* | 1/2023 | Tyagi | H02J 7/005 |
| 11,722,002 | B2* | 8/2023 | Polania Castro | H02J 9/062 |
| | | | | 307/9.1 |
| 11,945,315 | B2* | 4/2024 | Murphy | B60L 7/02 |
| 2011/0130906 | A1* | 6/2011 | Mayer | G07C 5/085 |
| | | | | 903/903 |
| 2013/0173107 | A1 | 7/2013 | Kokon | |
| 2014/0025245 | A1 | 1/2014 | Fanourakis et al. | |
| 2015/0051795 | A1 | 2/2015 | Keys, II et al. | |
| 2015/0274029 | A1 | 10/2015 | Tanaka et al. | |
| 2017/0021823 | A1 | 1/2017 | Ogawa | |
| 2018/0086227 | A1 | 3/2018 | Healy et al. | |
| 2018/0093655 | A1 | 4/2018 | Healy et al. | |
| 2018/0304944 | A1 | 10/2018 | Wright | |
| 2019/0207180 | A1 | 7/2019 | Richter et al. | |
| 2020/0156643 | A1 | 5/2020 | Hu et al. | |
| 2022/0021221 | A1* | 1/2022 | Tyagi | H02M 1/007 |
| 2022/0247205 | A1* | 8/2022 | Polania Castro | H02J 3/0012 |
| 2024/0017623 | A1* | 1/2024 | Stenbratt | B60T 8/172 |

OTHER PUBLICATIONS

International Search Report and Written Opinion of the International Searching Authority, PCT/EP2021/056695, mailed Dec. 7, 2021, 15 pages.
International Preliminary Report on Patentability, PCT/EP2021/056695, mailed May 24, 2022, 7 pages.

* cited by examiner

ELECTRICALLY POWERED TRAILER WITH AN ENDURANCE BRAKING FUNCTION

CROSS REFERENCE TO RELATED APPLICATION

This application is a 35 U.S.C. § 371 national stage application of PCT International Application No. PCT/EP2021/056695 filed on Mar. 16, 2021, the disclosure and content of which is incorporated by reference herein in its entirety.

TECHNICAL FIELD

The present disclosure relates to methods and control units for ensuring safe and efficient vehicle motion management of a heavy-duty vehicle. The methods are particularly suitable for use with articulated vehicles, such as semi-trailers and vehicle combinations comprising a plurality of vehicle units. The invention can, however, also be applied in other types of heavy-duty vehicles, e.g., in construction equipment and mining vehicles.

BACKGROUND

Heavy-duty vehicles, such as trucks and semi-trailer vehicles, are designed to carry heavy loads. The heavily laden vehicles must be able to start from standstill also in uphill conditions, accelerate on various types of road surfaces, and most importantly be able to reduce velocity, i.e., brake, in a controlled and reliable manner at all times.

A conventional heavy-duty vehicle normally uses some type of service brakes to decelerate the vehicle when desired. Such service brakes normally comprise friction brakes, i.e., disc brakes or drum brakes, which are very effective in generating high amounts of negative torque. However, friction brakes are not able to sustain this negative torque for extended periods of time, since the friction brakes then risk overheating, and so-called brake fading may ensue.

To enable slowing down a heavily laden vehicle also during extended periods of down-hill driving, often referred to as endurance braking, heavy-duty vehicles comprise auxiliary brakes in addition to the service brakes. Known auxiliary brakes comprise various forms of engine brakes such as exhaust brakes and different types of retarders.

Electric vehicles may use the electric machines to generate negative torque. This way some of the energy put into the vehicle when travelling up-hill may be recuperated when driving down-hill, which is an advantage from an energy efficiency point of view. A lot of effort has gone into designing energy efficient control systems for electrical vehicles, for instance:

US 2019/207180 discloses an electrified trailer comprising an electrical energy storage and electric machines arranged for regenerative braking, and US 2014/025245 relates to a hybridized trailer wherein a battery can be charged by regenerative charging.

However, electric vehicles powered from a battery pack or a fuel cell stack, do not comprise a combustion engine, and do not generate any exhaust. Thus, many of the commonly used auxiliary brake systems and retarders are not applicable for endurance braking of electric vehicles. Still, these vehicles may also be heavily laden and also need to be slowed down during extended periods of downhill driving.

There is an unmet need for new types of endurance braking systems applicable in heavy-duty electrically powered vehicles.

SUMMARY

It is an object of the present disclosure to provide techniques which alleviate or overcome at least some of the above-mentioned problems. This object is at least in part obtained by a vehicle unit comprising a vehicle control unit (VCU), an electrical energy storage system (EESS), and at least one electric machine arranged for regenerative braking. The electric machine is arranged to generate an electrical output current during regenerative braking of the vehicle unit. The control unit is arranged to obtain a desired energy absorption capability value of the vehicle unit and to control an energy dissipation from the EESS to maintain an energy absorption capability of the EESS above the desired energy absorption capability value. Thus, the VCU will strive to control energy dissipation from the EESS to maintain a margin with respect to full charge. This margin allows the vehicle unit to absorb a pre-determined amount of energy while driving down-hill, and thus provides a pre-determined amount of endurance braking which the vehicle unit can achieve. The vehicle unit is preferably a trailer vehicle unit, which can be used to efficiently slow down also a tractor vehicle unit in an efficient manner.

The desired energy absorption capability value can just be a pre-configured value, which may, e.g., be configured in dependence of an endurance braking requirement placed on the vehicle unit. This desired energy absorption capability value can optionally be obtained from a remote server or be manually configured in some way. Additional advantages may be obtained if the desired energy absorption capability value is configured in dependence of a planned route of the vehicle unit. This means that the desired energy absorption capability value is adapted to the current vehicle operating conditions, and thus optimized to suit a particular transport mission. This means that the margin value can often be selected smaller than a worst-case margin value. For instance, some vehicle may only operate in environments where there are no long down-hill routes, and consequently no need for large margins with respect to full charge.

According to some aspects, the desired energy absorption capability value is configured in dependence of any of: a vehicle gross combination weight $m_{GCW}$, a required maximum acceleration $a_{x,req}$, an air drag coefficient $C_d$, a vehicle front area $A_f$, an air density $\rho_{air}$, a vehicle maximum speed, a rolling resistance $C_r$, and an expected road slope degree s. This way an analytic or at least semi-analytic approach to determining requirements on the energy absorption capability can be used, where the particular properties of the vehicle and its intended operation can be used to derive a suitable energy absorption capability. This results in further optimization of the configured desired energy absorption capability. This also means that the energy absorption capability can be updated as the vehicle properties change over time, e.g., when the vehicle is heavily laden compared to when the vehicle is not so heavily laden.

According to some aspects, the control unit is arranged to control the energy dissipation from the EESS by feeding electrical current to a brake resistance device. Brake resistances may of course also be used to dissipate energy. Different vehicles may comprise brake resistances having different capabilities. The desired energy absorption capability may advantageously be configured in dependence of the brake resistances mounted to a given vehicle, i.e., a vehicle having more extensive brake resistance capacity may not need as large EESS charge margin compared to a vehicle which only comprises a smaller brake resistance or no brake resistance at all.

According to some aspects, the control unit is arranged to control the energy dissipation from the EESS by applying positive torque by the at least one electric machine. Thus, by applying torque a current will be drawn from the EESS. In case there is no need for acceleration by the vehicle unit, the applied positive torque will be compensated for by some other torque generating device on the vehicle, such as another electric machine on another vehicle unit in the vehicle combination. By applying positive torque when driving, e.g., on a flat road without slope, energy may even be transferred to the EESS on another vehicle unit applying regenerative braking to account for the positive energy dissipating torque.

According to some aspects, the control unit is arranged to trigger a notification signal in case the energy absorption capability of the EESS is below the desired energy absorption capability value. This will warn the driver about a potentially reduced endurance braking capability by the vehicle unit. According to some other aspects, the control unit is arranged to prevent operation of the vehicle unit in case the energy absorption capability of the EESS is below the desired energy absorption capability value. This means that the vehicle unit will be halted, or prevented from starting, in case there is not sufficient energy absorption capability to allow the required amount of endurance braking by the vehicle unit.

According to some aspects, the control unit is arranged to indicate a maximum cargo weight and/or a maximum vehicle gross combination weight $m_{GCW}$ corresponding to the desired energy absorption capability value of the vehicle unit. Thus, the driver or person loading the vehicle can receive guidance such as to not load the vehicle too much, since this may jeopardize the endurance braking capability of the vehicle unit.

According to some aspects, the control unit is arranged to control an applied torque by the at least one electric machine in dependence of a road friction coefficient. For instance, the control unit can be arranged to apply negative torque by the at least one electric machine in combination with a negative torque applied by one or more service brakes. The amount of negative torque applied by the at least one electric machine is determined in dependence of a current energy absorption capability of the EESS. Thus, advantageously, the control units disclosed herein may be arranged to perform brake blending in order to improve the braking capability of the vehicle unit and by the vehicle combination comprising the vehicle unit.

There is also disclosed herein control units, computer programs, computer readable media, computer program products, and vehicles associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
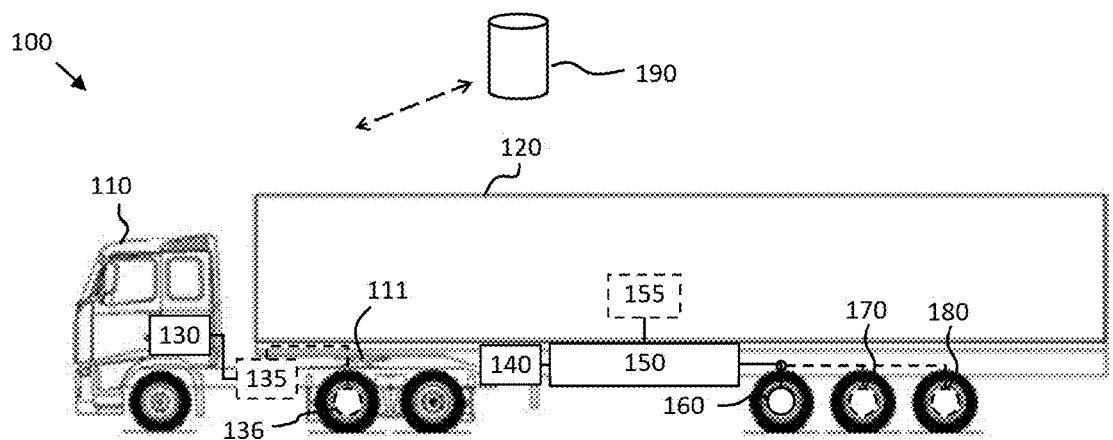
FIG. 1 schematically illustrates an example heavy-duty vehicle.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 illustrates a heavy-duty vehicle 100. This particular example is a vehicle combination comprising a tractor unit 110 which is arranged to tow a trailer unit 120. The tractor comprises a vehicle control unit (VCU) 130 arranged to control various functions of the vehicle 100. For instance, the VCU may be arranged to perform a vehicle motion management (VMM) function comprising control of wheel slip, vehicle unit stability, and so on. The trailer unit 120 also comprises a VCU 140 which controls one or more functions on the trailer. The VCU or VCUs may be communicatively coupled, e.g., via wireless link such as a cellular radio link, to a remote server 190, and may of course also be communicatively coupled to each other, where one of the VCUs may operate in a master mode of operation and the other may operate in a slave mode of operation. This remote server may be arranged to perform various configurations of the VCUs, such as setting different control parameters and performing software update functions.

The vehicle combination 100 may of course also comprise additional vehicle units, such as one or more dolly units and more than one trailer unit.

The trailer vehicle unit 120 comprises an electrical energy storage system (EESS) device 150 connected to one or more electric machines 160, 170, 180. Some trailer units may comprise just a single driven axle, while other trailer units may comprise more than one driven axle, possibly intended for use at different vehicle unit speeds. Thus, the trailer may assist in vehicle propulsion by applying a positive torque to the one or more driven axles by the respective electric machines 160, 170, 180 powered from the EESS. This torque may be controlled directly from the VCU 140 independently of any tractor control unit 130, or it can be controlled from the tractor VCU 130, i.e., the trailer control unit 140 may operate in slave configuration to the main VCU 130. The trailer VCU may in this case be very simple, comprising perhaps just some control circuitry for controlling the EESS and the electric machines.

According to an example, the trailer VCU 140 may be connected to a force sensor arranged at the fifth wheel connection 111 between tractor 110 and trailer. The VCU 140 may then apply torque at the trailer driven axle to reduce the force at the fifth wheel connection. This way the VCU may help in propulsion during up-hill driving and to overcome air resistances and other losses during driving on flat roads. The amount of positive torque may be limited in dependence of articulation angle, such that only a limited amount of positive torque is applied when the vehicle combination is in an articulated state.

Likewise, the VCU 140 may apply negative torque to the driven axle, i.e., a braking force, during downhill driving when the trailer unit otherwise pushes the tractor. Thus, importantly, the trailer unit 120 may also assist in slowing the vehicle 100 down. When the trailer VCU 140 (and/or the main tractor VCU 130) controls the one or more electric machines 160, 170, 180 such as to apply negative torque, electrical current is generated by the electric machines. This electrical current may be fed back into the EESS 150. However, if this EESS has a state of charge (SOC) close to full charge, the EESS will not be able to absorb the energy generated from braking the vehicle 100. In this case, the surplus energy may instead be fed to an optional braking resistance circuit 155 which is arranged to dissipate the generated electrical energy as heat. The braking resistance circuit converts energy into heat and is associated with a maximum operating temperature. Thus, when the braking resistance is heated up to the temperature limit, it will no longer be able to absorb surplus energy. A vehicle unit where the EESS has reached full SOC and where the braking resistance is at maximum temperature will not be able to apply negative torque, since there is no capability for absorbing the surplus energy generated during the regenerative braking.

The present disclosure relates to techniques which allow the trailer unit 120 to be used as an endurance braking device to provide endurance braking capabilities to the vehicle combination. This is accomplished by configuring a desired energy absorption capability of the trailer unit 120 in its control unit 140 or in the tractor control unit 130 if the two VCUs are operating in a master/slave mode of operation. This desired energy absorption capability represents an amount of energy, e.g., in Joules, which the vehicle unit should be able to absorb at any given point in time, or during some predetermined time period. The desired energy absorption capability may also comprise a capability in terms of power, i.e., an amount of energy which can be absorbed per unit of time, e.g., in Watts.

The trailer control unit 140 is configured to control an energy dissipation from the trailer unit EESS 150 over time in order to maintain the energy absorption capability of the EESS above the desired energy absorption capability value. This means that the control unit will strive to maintain a margin with respect to full SOC, such that the EESS is able to absorb energy if the vehicle should enter into prolonged period of downhill driving. In other words, the control unit will not strive for full charge, but rather try to maintain a SOC below full charge. This mode of operation admittedly results in a less energy efficient vehicle, but safety is increased since a measure of endurance braking capability is provided in exchange for the loss in energy efficiency.

It is appreciated that the techniques for endurance braking disclosed herein may be implemented as a special type of operation, which can be activated on-demand by a driver or by a technician. Thus, if the vehicle unit is operating under driving conditions where no endurance braking is required, then the endurance braking function can be inactivated, and the vehicle unit may then instead operate in a more energy efficient mode of operation where the desired SOC is equivalent to a full charge.

Of course, the tractor unit 110 may also comprise an EESS 135 arranged to power one or more electric machines 136. This torque generating system is then controlled from the tractor control unit 130. It is appreciated that the techniques disclosed herein are applicable also for use by the main tractor 110. In other words, the tractor unit may also be configured to maintain a margin in the EESS with respect to full charge, in order to enable an endurance braking capability.

Figure 2:
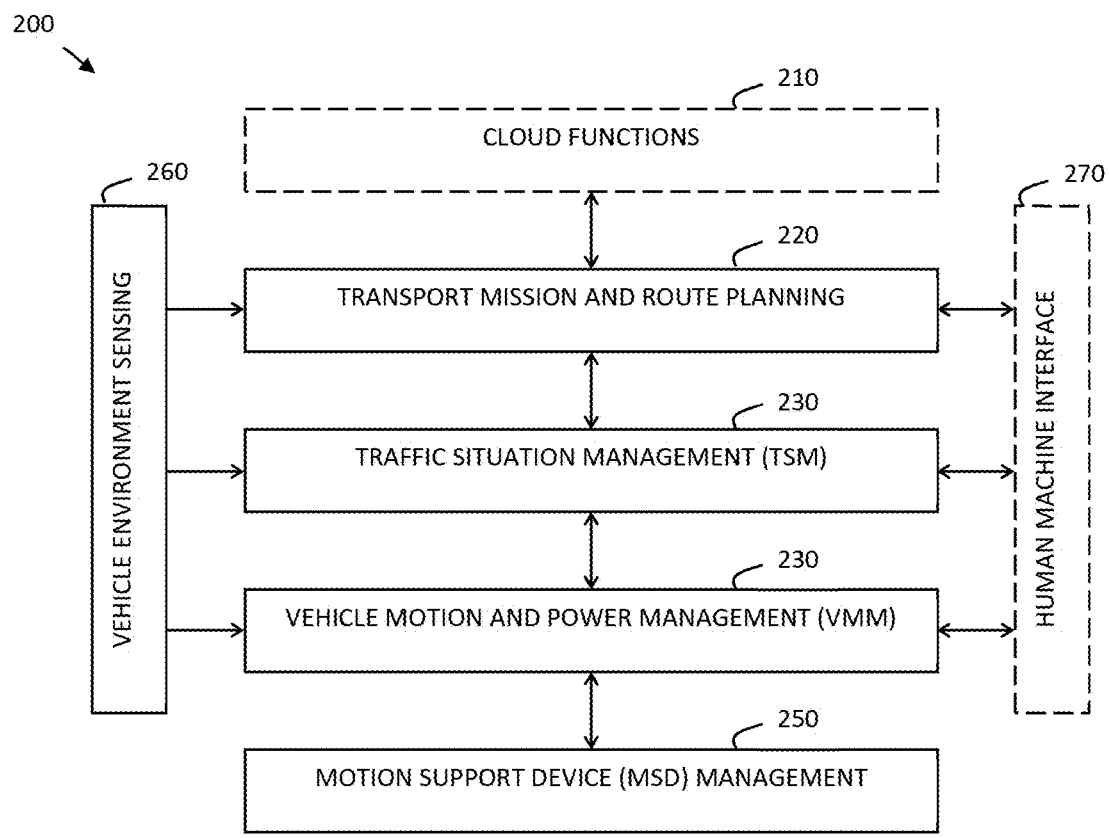
FIG. 2 illustrates an example vehicle control architecture.

FIG. 2 illustrates an example control architecture for controlling a vehicles such as that illustrated in FIG. 1. A transport mission and route planning function 220 may determine a suitable path to follow in order to complete a transport mission. This planning may, e.g., comprise evaluating braking energy requirements for different paths. Some paths from a starting location to a target destination may involve extended periods of down-hill driving where significant amounts of energy needs to be absorbed and/or dissipated by the vehicle EESS. Other paths may involve less downhill driving, or no downhill driving at all. Map data can be used to determine the height differences along a particular route. This height difference data, possibly together with gross combination weight data and other properties of the vehicle, can be used to determine a required amount of braking capability.

The transport mission and route planning function 220 is in communication with a traffic situation management (TSM) function 230 that plans driving operations with a time horizon of, e.g., 3-30 seconds or so. This time frame corresponds to the time it takes for the vehicle 100 to, e.g., negotiate a curve or perform some other maneuver. The vehicle maneuvers, planned and executed by the TSM, can be associated with acceleration profiles and curvature profiles which describe a desired vehicle velocity and turning for a given maneuver. The TSM function continuously requests the desired acceleration profiles $a_{req}$, and curvature profiles $c_{req}$ from a vehicle motion management (VMM) function 230 which performs force allocation and vehicle motion support device (MSD) coordination to meet the requests from the TSM function 230 in a safe and reliable manner. The VMM function 230 then continuously sends instructions to the various MSD control units which are comprised in an MSD management function 250. Some example MSD which are controlled in this manner comprise, e.g., the electric machines, any friction brakes on the vehicle units, steering arrangements, active suspension, and so on.

Sensors such as vision-based sensors, radars and lidars, are arranged to obtain data about the vehicle environment 260 and to provide input to the vehicle control stack 200. An optional connection to remote processing resources, such as cloud-based processing resources 210 may also be comprised in the control stack 200. The remote server 190 schematically shown in FIG. 1 is then comprised in this type of cloud processing function 210.

The VMM function 230 operates with a time horizon of about 1-3 seconds or so, and continuously transforms the acceleration profiles are q and curvature profiles $c_{req}$ into control commands for controlling vehicle motion functions, actuated by the different MSDs of the vehicle 100, which report back capabilities to the VMM, which in turn may be used as constraints in the vehicle control. The VMM function 230 performs vehicle state or motion estimation, i.e., the VMM function continuously determines a vehicle state (often a vector variable) comprising positions, speeds, accelerations, yaw motions, normal forces, and articulation angles of the different units in the vehicle combination by monitoring vehicle state and behavior using various sensors 260 arranged on the vehicle 100, often but not always in connection to the MSDs.

Desired acceleration profiles and curvature profiles may optionally be determined based on input from a driver via a human machine interface 270 of the heavy-duty vehicle via conventional control input devices such as a steering wheel, accelerator pedal and brake pedal, although the techniques disclosed herein are just as applicable with autonomous or semi-autonomous vehicles. The exact methods used for determining the acceleration profiles and curvature profiles is not within scope of the present disclosure and will therefore not be discussed in more detail herein. Notably, the TSM function 230 and/or the transport mission and route planning function 220 may configure various properties of the vehicle, such as raising and lowering a liftable axle, adjusting suspensions, and so on.

Figure 3:
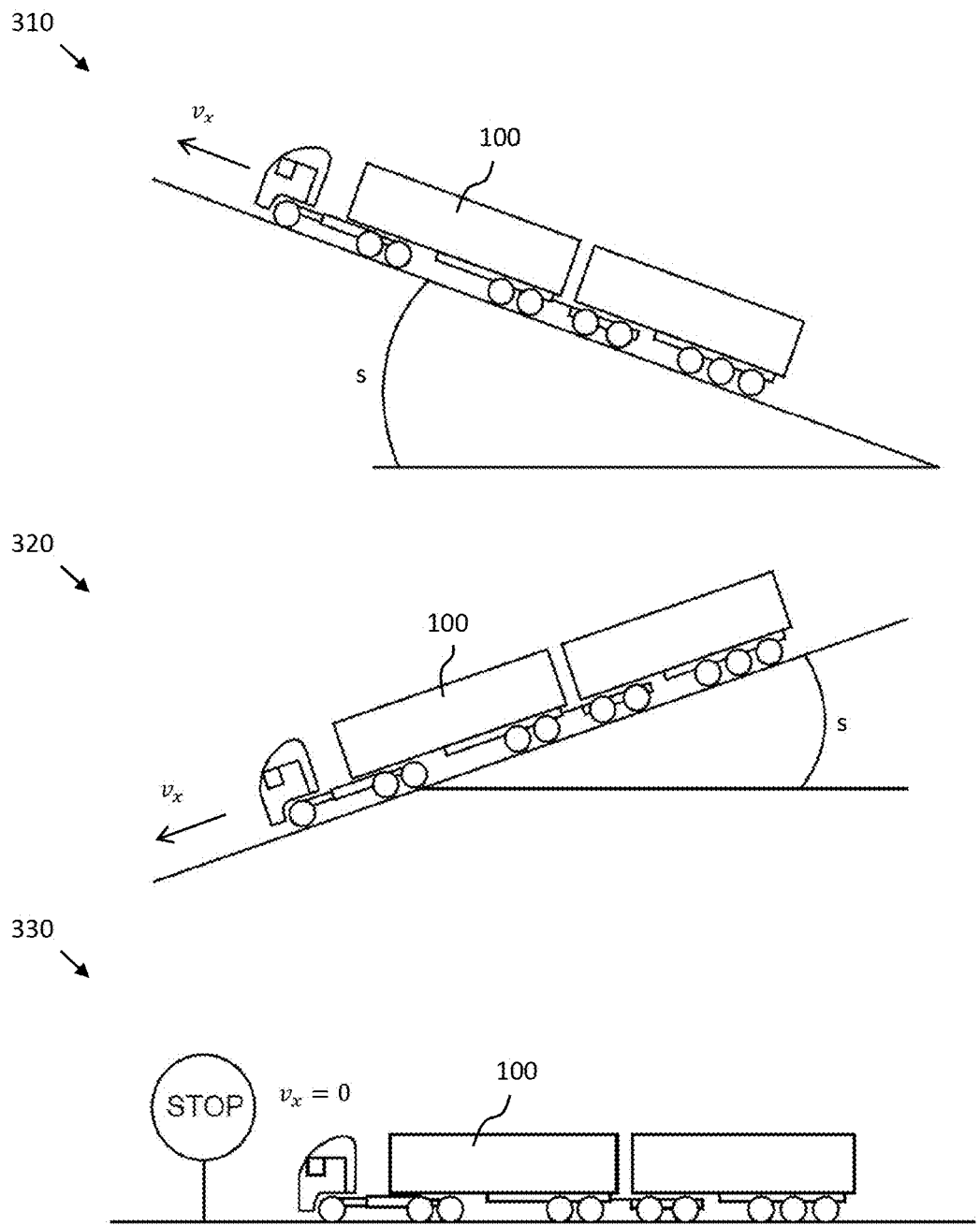
FIG. 3 illustrates some example driving scenarios.

FIG. 3 illustrates some examples of use-cases which the vehicle 100 must be able to support. The use-case 310 is an uphill driving use-case, possibly involving uphill launch from stand-still or from low speed, where the vehicle must be able to generate sufficient torque to overcome gravitational pull as well as friction losses. The use-case 320 is instead a downhill driving scenario where braking is required if the vehicle should not exceed its maximum allowable vehicle speed. The vehicle 100 must be able to maintain a vehicle velocity below a configured maximum vehicle velocity for the duration of the downhill drive, which may require endurance braking. Finally, FIG. 3 also shows a use-case 330 involving stopping the vehicle 100 within a maximum stopping distance.

The different use-cases 310, 320, 330 imply peak torque requirements, both with respect to positive as well as negative torque, which must be met by the combination of torque generating devices on the vehicle 100, including the electric machines.

The longitudinal force $F_{x,req}$ in, e.g., Newton (N), required to be generated by the vehicle 100 can be approximated as $$F_{x,req} = m_{GCW}a_{x,req} + 0.5C_dA_f\rho_{air}v_x^2 + gC_r m_{GCW} + m_{GCW}g\sin\left(\text{atan}\left(\frac{s}{100}\right)\right)$$

where $m_{GCW}$ is the vehicle gross combination weight, $a_{x,req}$ is the required acceleration by the vehicle, $C_dA_f$ is the product of air drag coefficient $C_d$ and vehicle front area $A_f$, $\rho_{air}$ represents air density, $v_x$ is the vehicle speed, g is the gravitational constant, $C_r$ is rolling resistance, and s is a slope percentage value between 0 and 100.

In uphill driving positive torque scenarios, such as case 310 in FIG. 3, the terms $0.5C_dA_f\rho_{air}v_x^2$ and $gC_r m_{GCW}$ must be overcome by the MSDs, while in downhill scenarios the terms instead must be compensated for to brake the vehicle 100 in order to maintain $v_x$ below the maximum allowable velocity of the vehicle. This means that the electric machine (s) should be dimensioned to support positive torque sufficient for use case 310, while the combination of friction braking devices and the electric machine(s) should be dimensioned to provide a combined negative torque to support use cases 320 and 330, where use case 320 may comprise an extended duration endurance braking.

The output energy from the one or more electric machines on the different vehicle units for a given route can be predicted from a relationship like that above. For instance, suppose that the vehicle is required to be able to travel down a hill having a slope of, say s=20 for a certain distance. Given the maximum allowable velocity $v_x^{max}$ the required braking torque can be determined from the above relationship. Given the expected time duration for the down-hill travel, and the required negative torque, an expected amount of generated energy form regenerative braking can be determined. The EESS of the vehicle unit must then be able to absorb this amount of energy, otherwise the negative torque will not be sustainable for the duration of the down-hill drive.

If the route height profile is known, e.g., by the transport mission and route planning function 220, then a desired energy absorption capability of the vehicle unit can be determined rather accurately. However, if the route data is not known, then assumptions on braking requirements can be made, and the desired energy absorption capability can be determined from the assumptions. The assumptions may be related to an operational design domain (ODD) of the vehicle unit.

To summarize, it is possible to predict an amount of energy which will be generated by one or more electric machines on a vehicle 100, given assumptions and/or data related to height profiles of travelled routes by the vehicle and assumptions, or more exact data, related to vehicle properties such as weight. As long as an energy absorption capability of the vehicle is above that required for regenerative braking, safe operation by the vehicle can be assured.

Notably, a trailer unit 120 can be used to brake an entire combination vehicle 100 when travelling down-hill. Thus, if the energy absorption capability of a trailer unit 120 is sufficient to brake the vehicle 100, then the requirements of endurance braking placed on other vehicle units, such as on the tractor 110, can be relaxed.

With reference again to FIG. 1, there is disclosed herein a vehicle unit 110, 120 comprising a vehicle control unit (VCU) 130, 140 an electrical energy storage system (EESS) 135, 150, and at least one electric machine 136, 160, 170, 180 arranged for regenerative braking. There may be one or more driven axles on the trailer 120 connected to the EESS 150. The tractor unit 110 may or may not be an electric vehicle, i.e., the electric machine 136 and EESS 135 on the tractor 110 are entirely optional. The trailer units 120 disclosed herein may be arranged to operate together with legacy tractor units 110 which do not comprise any advanced control units or electrical propulsion systems. In these cases the trailer units operate independently from the tractor unit 110. In other cases the tractor unit VCU 130 is an advanced control unit capable of assuming a master role. The trailer VCU 140 may then operate in a slave mode of operation where it receives requests and instructions from the master VCU 130.

The electric machine generates an electrical output current during regenerative braking. This electrical current represents an amount of energy which must be absorbed somehow by the vehicle unit. In order to assure that the vehicle unit does not reach a state where energy can no longer be absorbed, the control unit 130, 140 is arranged to obtain a desired energy absorption capability value of the vehicle unit 110, 120 and to control an energy dissipation from the EESS 135, 150 to maintain an energy absorption capability of the EESS 135, 150 above the desired energy absorption capability value. Thus, the vehicle unit will be ready to absorb an amount of energy at all times. Differently put, the desired energy absorption capability value corresponds to a state of charge (SOC) of the EESS 135, 150 by a margin below full charge, which ensures that there will always be room for regenerated energy from the electric machines. In other words, the vehicle units disclosed herein will target a SOC below full charge, i.e., voluntarily operate in an energy inefficient mode of operation, in order to enable endurance braking. As was discussed above, the margin to be maintained below full charge can be determined in different ways, e.g., based on assumptions, based on a set of required vehicle capabilities in terms of endurance braking, or more accurately based on route planning data and height maps associated with a route to be travelled.

Thus, additional advantages can be obtained depending on how the desired energy absorption capability value is configured. Of course, the desired energy absorption capability value may just be a factory pre-set value or a pre-configured value input by a technician, which optionally can be subject to update from, e.g., the remote server 190. This value may be configured based on worst-case assumptions made about gross combination weight, worst case routes, and so on.

More advanced options comprise configuring the desired energy absorption capability value in dependence of planned route of the vehicle unit. This way the transport mission and route planning function 220 may obtain information related to expected sections of downhill driving along a planned route. This information may then be used to approximate an expected energy generation by the regenerative brakes, and plan for absorbing this amount of energy by the EESS. Thus, a vehicle unit which is to move along a route which is essentially flat may permit a SOC near full charge, while a vehicle unit which is to travel downhill from start to destination instead leaves more SOC margin with respect to full charge. Of course, the configured desired energy absorption capability may also be determined as a function of any other means of energy dissipation available on the vehicle unit. For instance, the capacity and current state of any break resistances 155 mounted in connection to the EESS can be accounted for. Some trailer units also comprise refrigerated compartments and other energy absorbing devices which can be accounted for in the overall energy budget to ensure that the desired energy absorption capability is met.

To summarize, a key concept of the present disclosure relates to maintaining an amount of "free space" in the vehicle unit EESS in order to be able to absorb energy during periods of down-hill driving, i.e., to provide an endurance braking capability. Exactly how much room to leave in the EESS can be determined in different ways and may depend on factors such as an energy dissipating capability of other components on the trailer unit, such as a braking resistance, a cooled freight compartment, and so on. One way to determine the desired energy absorption capability is to make worst case assumptions on vehicle parameters and vehicle routes in terms o height differences, and to use a relationship for required longitudinal force in order to calculate a corresponding requirement on energy absorption capability. Another way to determine the desired energy absorption capability is to obtain data related to a planned route, and to make more exact calculations regarding the expected amount of regenerated energy that the vehicle unit must be able to handle, and then configure the desired energy absorption capability based on this expected amount.

As discussed above, the desired energy absorption capability value may be configured in dependence of any of a an estimated, assumed, or calculated vehicle gross combination weight $m_{GCW}$, a required maximum acceleration $a_{x,req}$, an air drag coefficient $C_d$, a vehicle front area $A_f$, an air density $\rho_{air}$, a vehicle maximum speed, a rolling resistance $C_r$, and an expected road slope degree s. By determining the required longitudinal force $F_{x,req}$ required to maintain vehicle speed below a maximum vehicle speed during down-hill driving, a corresponding torque to be generated by the electric machine can be calculated. This torque then corresponds to an amount of generated energy which must be absorbed somehow by the vehicle unit. Notably, the relationship between required longitudinal force $F_{x,req}$ and vehicle parameters, $$F_{x,req} = m_{GCW} a_{x,req} + 0.5 C_d A_f \rho_{air} v_x^2 + g C_r m_{GCW} + m_{GCW} g \sin\left(\operatorname{atan}\left(\frac{s}{100}\right)\right)$$

can be determined dynamically based on current vehicle data, or based on limiting assumptions, such as maximum gross combination weight, assumed air resistance, and so on. It is appreciated that the vehicle unit can be configured to generate endurance braking to brake itself, and not other vehicle units in the vehicle combination, or to assist in braking also other vehicle units.

It is noted that relationships between generated wheel force and applied torque are known, where the applied torque $T_w$ depends on force $F_x$ as $$T_w = F_{x,req} R_w$$

where $R_w$ is a rolling radius of the wheel. The relationship between applied torque and regenerated energy is often possible to obtain from electric machine specification. Otherwise, this relationship can be determined during vehicle operation or by other means of testing. The relationship can then be stored by the VCU 130, 140.

Energy can also be dissipated by applying positive torque by the at least one electric machine 136, 160, 170, 180. Thus, the control unit may apply a positive torque also during periods of downhill driving in small slopes in order to dissipate energy in order to maintain the desired energy absorption capability. This positive torque will then need to be compensated for by the other vehicle unit torque generating devices. It is appreciated that this results in an energy efficient operation, but it may be required in order to maintain an endurance braking capability.

Figure 4:
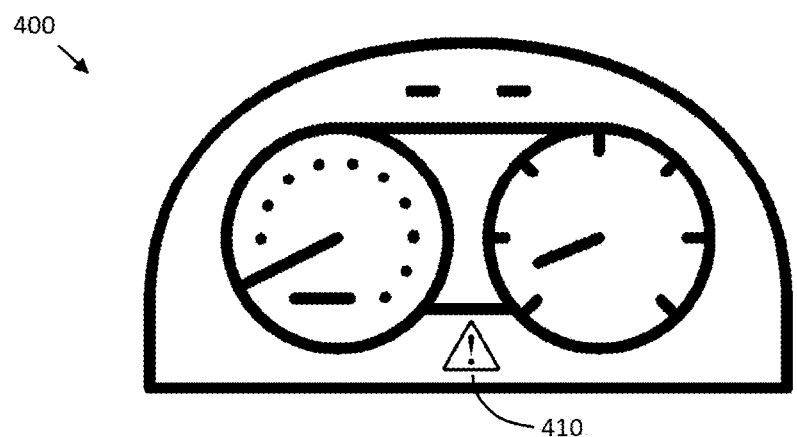
FIG. 4 schematically shows a vehicle information display system.

FIG. 4 schematically illustrates a display means 400 where various notifications and warning signals can be displayed to, e.g., a driver. According to some aspects, the control unit 130, 140 is arranged to trigger a notification signal 410 in case the energy absorption capability of the EESS 135, 150 is below the desired energy absorption capability value. This notification provides a warning to the driver that the endurance braking capability of the vehicle is currently limited. The driver may then take appropriate action in order to increase the energy absorption capabilities of the vehicle unit. The control unit 130, 140 may optionally prevent operation of the vehicle unit 110, 120 in case the energy absorption capability of the EESS 135, 150 is below the desired energy absorption capability value.

The amount of energy which must be absorbed during downhill driving of course strongly depends on the gross combination weight $m_{GCW}$, of the vehicle 100. Thus, according to some aspects, the control unit 130, 140 may be arranged to indicate a maximum cargo weight and/or a maximum vehicle gross combination weight $m_{GCW}$ corresponding to the desired energy absorption capability value of the vehicle unit.

At least one of the control units 130, 140 may also be arranged to control an applied torque by the at least one electric machine 136, 160, 170, 180 in dependence of an estimated or otherwise determined road friction coefficient. For instance, it makes no sense to apply more torque than the current driving conditions can handle by a set of wheels, since this would just result in excessive wheel slip. In case of low road friction, the control unit may combine braking torque from the one or more electrical machines and from one or more service brakes, e.g., friction brakes. This increases the total tyre contact patch area used for braking, which is an advantage in low friction conditions.

At least one of the control units 130, 140 may optionally also be arranged to apply negative torque by the at least one electric machine 136, 160, 170, 180 in combination with a negative torque applied by one or more service brakes, wherein the amount of negative torque applied by the at least one electric machine 136, 160, 170, 180 is determined in dependence of a current energy absorption capability of the EESS 135, 150. Thus, for instance, if the current energy absorption capability does not allow for the required amount of negative torque, the control unit or units may blend in negative torque from one or more service brakes. It is noted, however, that the service brakes cannot be used for extended periods of endurance braking, since this would invariably result in overheated friction brakes and loss of braking capability.

Figure 5:
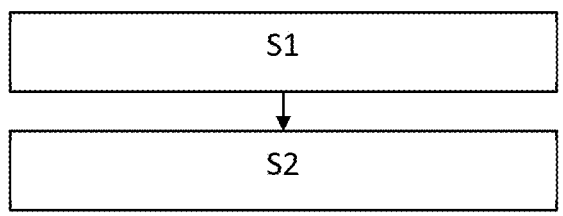
FIG. 5 is a flow chart illustrating example methods.

FIG. 5 is a flow chart illustrating methods which summarize the discussions herein. There is illustrated a method performed by a VCU 130, 140 comprised in a vehicle unit 110, 120 comprising an EESS 135, 150, and at least one electric machine 136, 160, 170, 180 arranged for regenerative braking. The method comprising obtaining S1 a desired energy absorption capability value of the vehicle unit 110, 120 and controlling S2 an energy dissipation from the EESS 135, 150 to maintain an energy absorption capability of the EESS 135, 150 above the desired energy absorption capability value. Of course, all of the different options and variants discussed above may also be comprised as steps in the disclosed methods.

Figure 6:
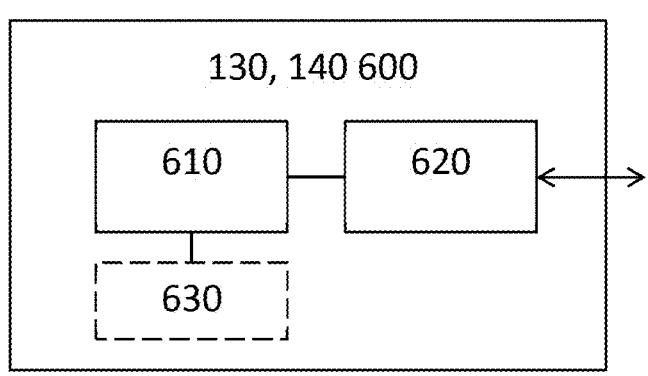
FIG. 6 schematically illustrates a sensor unit and/or a control unit.

FIG. 6 schematically illustrates, in terms of a number of functional units, the components of a control unit 600 according to embodiments of the discussions herein, such as any of the VUCs 130, 140. This control unit 600 may be comprised in the articulated vehicle 1. Processing circuitry 610 is provided using any combination of one or more of a suitable central processing unit CPU, multiprocessor, microcontroller, digital signal processor DSP, etc., capable of executing software instructions stored in a computer program product, e.g. in the form of a storage medium 630. The processing circuitry 610 may further be provided as at least one application specific integrated circuit ASIC, or field programmable gate array FPGA.

Particularly, the processing circuitry 610 is configured to cause the control unit 600 to perform a set of operations, or steps, such as the methods discussed in connection to FIG. 6. For example, the storage medium 630 may store the set of operations, and the processing circuitry 610 may be configured to retrieve the set of operations from the storage medium 630 to cause the control unit 600 to perform the set of operations. The set of operations may be provided as a set of executable instructions. Thus, the processing circuitry 610 is thereby arranged to execute methods as herein disclosed.

The storage medium 630 may also comprise persistent storage, which, for example, can be any single one or combination of magnetic memory, optical memory, solid state memory or even remotely mounted memory.

The control unit 600 may further comprise an interface 620 for communications with at least one external device. As such the interface 620 may comprise one or more transmitters and receivers, comprising analogue and digital components and a suitable number of ports for wireline or wireless communication.

The processing circuitry 610 controls the general operation of the control unit 600, e.g., by sending data and control signals to the interface 620 and the storage medium 630, by receiving data and reports from the interface 620, and by retrieving data and instructions from the storage medium 630. Other components, as well as the related functionality, of the control node are omitted in order not to obscure the concepts presented herein.

Figure 7:
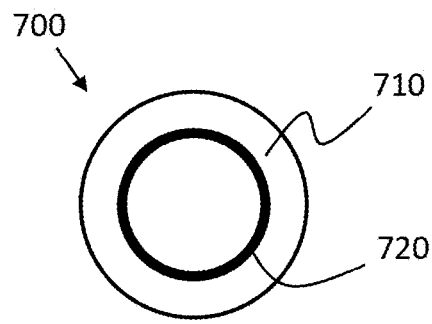
FIG. 7 shows an example computer program product.

FIG. 7 illustrates a computer readable medium 710 carrying a computer program comprising program code means 720 for performing the methods illustrated in FIGS. 6A-C, when said program product is run on a computer. The computer readable medium and the code means may together form a computer program product 700.

The invention claimed is:

1. A vehicle unit comprising a vehicle control unit, VCU, an electrical energy storage system, EESS, and at least one electric machine arranged for regenerative braking, wherein the electric machine is arranged to generate an electrical output current during regenerative braking of the vehicle unit, wherein the control unit is arranged to obtain a desired energy absorption capability value of the vehicle unit and to control an energy dissipation from the EESS to maintain an energy absorption capability of the EESS above the desired energy absorption capability value, wherein the control unit is arranged to control the energy dissipation from the EESS by feeding electrical current to a brake resistance device.

2. The vehicle unit according to claim 1, wherein the desired energy absorption capability value corresponds to a state of charge, SOC, of the EESS by a configurable margin below full charge.

3. The vehicle unit according to claim 1, wherein the desired energy absorption capability value is a pre-configured value.

4. The vehicle unit according to claim 1, wherein the desired energy absorption capability value is obtained from a remote server.

5. The vehicle unit according to claim 1, wherein the desired energy absorption capability value is configured in dependence of a planned route of the vehicle unit.

6. The vehicle unit according to claim 1, wherein the desired energy absorption capability value is configured in dependence of any of: a vehicle gross combination weight, a required maximum acceleration, an air drag coefficient, a vehicle front area, an air density, a vehicle maximum speed, a rolling resistance, and an expected road slope degree.

7. The vehicle unit according to claim 1, wherein the control unit is arranged to control the energy dissipation from the EESS by applying positive torque by the at least one electric machine.

8. The vehicle unit according to claim 1, wherein the control unit is arranged to trigger a notification signal in case the energy absorption capability of the EESS is below the desired energy absorption capability value.

9. The vehicle unit according to claim 1, wherein the control unit is arranged to prevent operation of the vehicle unit in case the energy absorption capability of the EESS is below the desired energy absorption capability value.

10. The vehicle unit according to claim 1, wherein the control unit is arranged to indicate a maximum cargo weight and/or a maximum vehicle gross combination weight corresponding to the desired energy absorption capability value of the vehicle unit.

11. The vehicle unit according to claim 1, wherein the control unit is arranged to control an applied torque by the at least one electric machine in dependence of a road friction coefficient.

12. The vehicle unit according to claim 1, wherein the control unit is arranged to apply negative torque by the at least one electric machine in combination with a negative torque applied by one or more service brakes, wherein the amount of negative torque applied by the at least one electric machine is determined in dependence of a current energy absorption capability of the EESS.

13. A method performed by a vehicle control unit, VCU, comprised in a vehicle unit comprising an electrical energy storage system, EESS, and at least one electric machine arranged for regenerative braking, wherein the electric machine generates an electrical output current during regenerative braking, the method comprising obtaining a desired energy absorption capability value of the vehicle unit and controlling an energy dissipation from the EESS to maintain an energy absorption capability of the EESS above the desired energy absorption capability value.

14. A computer program comprising program code means which, when said program is run on a computer or on processing circuitry of a control unit, cause the computer or processing circuitry of the control unit to carry out the method of claim 13.

15. A computer readable medium carrying the computer program of claim 14.

* * * * *